Patented Aug. 13, 1935

2,010,850

UNITED STATES PATENT OFFICE 2,010,850

MANUFACTURE OF CELLULOSE DERIVATIVES

Henry Dreyfus, London, England

No Drawing. Application August 5, 1920, Serial No. 401,381. In Great Britain September 1, 1919

2 Claims. (Cl. 260—152)

This invention relates to the manufacture of alkyl ethers of cellulose, and especially of ethyl or methyl ethers of cellulose.

The production of alkyl ethers of cellulose, particularly methyl and ethyl ethers, was described by Suida (Monatsheft für Chemie XXVI, 1905, pp. 415 et seq.) and Dreaper (Chemistry and Physics of Dyeing, 1906, p. 20). Patents were subsequently taken out by L. Lilienfeld for the manufacture of alkyl ethers of cellulose in which one or more of the hydroxyl hydrogens of the cellulose are replaced by alkyl radicals, by treating cellulose or its conversion products or derivatives with basic substances and inorganic alkyl esters (British Patents 12854/1912 and 6035/1913 and U. S. Patent 1,188,376).

According to the processes particularly described for the manufacture of ethyl cellulose in the said British and American patents the cellulose or cellulose derivative is to be treated with the alkylating agent such as diethyl sulphate, in aqueous caustic alkali solution in such manner that water-soluble cellulose ethers are always produced either as partly etherified final products or intermediately in the formation of further etherfied water-insoluble products, and in the processes described in the said patents there is used cellulose which has been regenerated from viscose by heating, or from cupro ammoniacal solutions or cellulose which has been prepared by heating it with more or less concentrated caustic alkali solutions until the cellulose is soluble in caustic alkali.

I have found that cellulose ethers, and in particular ethyl and methyl ethers of cellulose are analogous to cellulose acetates in the sense that the degree of alkylation, i. e., the alkyl content corresponding to the number of replaced hydroxyl hydrogens of the cellulose, is of itself no criterion for the properties or quality of the products, just as in the case of cellulose acetates the acyl content of the ester, e. g., that it corresponds to 2, 2½, 3 or more molecules of acetic acid, is of itself no criterion for the properties and quality of the ester. In both cases the only real criterion is the behaviour of the products to given solvents and the quality and properties of the films or bodies left on evaporation of the solvents from their solutions. In other words, similarly to cellulose acetates, cellulose ethers having the same alkyl content may nevertheless be quite different from each other in behaviour and properties according to the manner in which they have been produced; they may behave differently to the same solvents, or one may be a very hydrolyzed product and the other not, or one may give good films whilst the other gives brittle films, and so on.

Similarly to what is the case with cellulose acetates, the most important property to be sought with cellulose ethers is that of high viscosity of the etherified product, which is an essential condition for the satisfactory employment of the cellulose ethers for the principal technical applications, such as the manufacture of films, artificial silk, celluloid-like masses and so forth, low viscosity or absence of viscosity involving, as a necessary consequence, weakness and brittleness of the films, fibres or other products made, and the strength and flexibility of the films or products is greater in proportion as the viscosity of the cellulose ethers is higher.

I have found that cellulose ethers of high quality and possessing high viscosity cannot be obtained if the cellulose molecule or aggregate suffers more or less intense depolymerization or degradation before or during the process of etherification. As is known, the degradation of the cellulose molecule in the production of cellulose compounds or derivatives is evidenced, amongst other facts, by solubility in water (when used alone without any other chemical ingredients) either of the intermediate cellulose compounds or of the final cellulose compounds, even though the final cellulose compound may itself be insoluble in water.

As showing the destructive action of alkali solution on cellulose, trials have shown that if, per molecule of cellulose, four molecules of alkali are used in a fifty per cent. solution and the mixture is heated for about eight hours to 70°–80° C., the cellulose is partly destroyed and only about 65%–70% by weight of the original cellulose remains available. Solubility of cellulose in alkali seems to imply in fact nothing else than that the cellulose has been more or less destroyed or depolymerized.

The present invention enables new alkyl ethers, and in particular new ethyl and methyl ethers of cellulose, to be produced of high viscosity and quality, possessing properties which render them suited for the principal technical applications such as above referred to.

These ethers are characterized by the fact that, independently of their alkyl content, i. e. whether this corresponds to the replacement of one, two or three hydroxyl hydrogens of cellulose, they are insoluble in hot or cold water, and that at no intermediate stage of etherification in passing to the fully or highly etherified product are any products passed through which are soluble in hot or cold water. Moreover, even in the case of those of the new ethyl, methyl or homologous alkyl ethers of cellulose in which only some of the hydroxyl hydrogens are replaced by alkyl, these ethers are not precipitated from alcoholic solution by alcohol solutions of alkali, and no intermediate products thus precipitable are formed in the production of any of the new alkyl celluloses.

The higher or fully ethylated cellulose products are soluble in alcohol-benzene, alcohol, and in many of the organic solvents of the known cellulose ethers, with the exception of water as before mentioned; the solubility in organic solvents diminishes in proportion as the number of ethyl groups introduced is less.

An important advantage of the invention is also that by appropriately working the process in accordance with the particulars hereinafter contained, quantitative yields of the cellulose ethyl ether can be obtained relatively to the weight of the cellulose employed, with little or no loss or destruction of the cellulose or the highly etherified cellulose ether or intermediate products, whereas when water-soluble cellulose ethers are made, either as intermediate products, or as end products or are transformed by further treatment into insoluble further products, the yield based on the weight of the employed cellulose and the weight of ether to be obtained according to the equation is very low, for example only one third to a half of the total quantity which should be obtained. Moreover, with the present invention, the cellulose used for transformation into ethers can be completely transformed into highly etherified, completely soluble products. Thus by properly observing the conditions given one can obtain, for 100% of cellulose, between 140% and 155% of the highly ethylated cellulose, soluble in organic solvents, insoluble in water and without formation of intermediate water-soluble ethers at any stage of the ethylation.

Another advantage of the present invention is that the manufacture of the new alkyl ethers of cellulose can be carried out with much smaller quantities of alkalies and alkylating agents, such as diethyl sulphate, than have hitherto been employed in the known processes for obtaining the lower and high ethylated products.

According to the present invention for making cellulose ethyl ethers, cellulose or its near conversion products not soluble in alkali are treated with diethyl sulphate or other ethylating agent in presence of caustic alkali and restricted quantities of water, such that the quantity of water present whether contained in or added to the cellulose or cellulose conversion product before the etherification or added during the etherification (but disregarding water which may be formed in the reaction itself), is at no stage of the etherification process greater than about from the natural humidity content of the cellulose or cellulose conversion products employed, up to about 200%, and in any case not greater than about 400% relatively to the weight of the cellulose (taken as 100%) and preferably not greater in amount than about 50% to 150% relatively to the weight of the cellulose or conversion product, and that the total alkali used in the etherification process is at least equal in weight to, and preferably exceeds, in a ratio of from 3:1 to 19:1 or more, the weight of water present or added during the etherification (disregarding water which may be formed in the reaction itself). One may go below 50% of water relatively to the weight of the cellulose, for example even to the ordinary humidity content of the cellulose, and add the alkali in a powdered state and grind it with the cellulose or conversion product; it is however less advantageous to go below about 50% water content.

It is to be well understood, however, that the foregoing statement does not imply that one can use alkali alcoholate or alkali metal, because if it is attempted to use the same the cellulose becomes decomposed in quite a different way, and etherification trials have been found to give decomposition products like oils. Perhaps this may be due to the alkali alcoholate acting too strongly and splitting off water from the hydroxyl groups of the cellulose by chemical action.

It is understood that the restricted quantities of water before mentioned may be present in or introduced into the cellulose or conversion product prior to the ethylating process or may be introduced partly or entirely during the etherification process. By way of illustration, the cellulose having the desired amount of water above indicated contained in it or introduced into it, the alkali may be added in powdered form for example; or one may start with a more or less concentrated solution of alkali in water, corresponding to the above indicated limits of water quantity. Or one may start with an alkaline solution and impregnate the cellulose with this solution, under such conditions that the amount of water will correspond before or during the reaction to the above stated limits of water content. Thus, for example the cellulose may be impregnated with a 50% alkali solution and pressed out afterwards to such an extent that say about 100% of water remains in it (relatively to the weight of the cellulose taken as 100%), and a corresponding quantity of alkali, whilst the rest of the alkali is added in powdered form before or during the ethylation or any other concentration of alkali solution may be adopted and the water content be brought down within the above limits by pressing out or hydro-extracting or any other means for removing humidity, the rest of the alkali being added all at once or during the reaction either continuously or at intervals in different stages.

It is to be understood, however, that the relationship between the total quantity of alkali employed and the quantity of water or humidity present or added during the etherification (disregarding water formed in the reaction) shall be such as would correspond to a solution of about 75% to 95% or more of alkali hydroxide in the above stated limits of water quantity, and in any case to a solution of not less than about 50%, if the total alkali employed were dissolved in solid or other form in such a quantity of water, that is to say the total alkali used is at least equal in weight to the weight of water present or added as mentioned, and preferably exceeds the same in a ratio of from 3:1 to 19:1 or more as before mentioned. This indication is of course only given as a standard or guide as to the total quantities of water and alkali employed in the process, as it is well understood that during the reaction the alkali content decreases in proportion as the reaction with the alkylating agent such as diethyl sulphate proceeds, and that the alkali may be added all at once before the reaction or in portions at different stages of the reaction or continuously during the reaction, as before mentioned.

As illustrating the importance of the concentrated application of the alkali and not employing more water in the process than would correspond at the lowest to a 50% solution by weight of the alkali in the sense above indicated, it may be explained that in proportion as one goes below 50% the yields of the finished soluble product of good quality decrease, whilst in proportion as one goes above this lower limit so the yields increase with the same quantity of alkali and diethyl sulphate.

As before explained, the cellulose or conversion product may be made to contain the right water content at the beginning, or it may be impregnated with the alkali solution and pressed out, centrifuged or otherwise treated so as to leave the right quantity of water in it, the rest of the alkali being added in powdered or other form all at once, or continuously or at intervals or stages alternately or together with the diethyl sulphate or other ethylating agent. It will be understood that in the measure as the reaction proceeds in the case in which the caustic soda or alkali is added all at once or intermittently in stages, the concentration of the alkali decreases, the alkali being so to say neutralized by the action of the diethyl sulphate, but on the other hand by this reaction salts are formed as by-products, such as sodium sulphate and sodium ethyl sulphate, and it may be that such salts attract, bind or absorb water, salt the alkali out and drive it to the cellulose so as to keep up the alkali cellulose salt and prevent the dissociation of the cellulose body or the intermediate cellulose ether on the one hand and the alkali on the other hand. It is a known fact that when alkali cellulose is diluted with water below a certain concentration, e. g. below about 14–16%, dissociation takes place, so that no alkali remains bound to the cellulose in the form of alkali salt.

The diethyl sulphate or other ethylating agent is introduced all at once or interruptedly in stages during the reaction or continuously during the reaction. If the alkali is introduced all at once, the diethyl sulphate or other ethylating agent may be introduced all at once also or intermittently over a certain time or continuously. Or the alkali may be introduced intermittently in stages, for example two to four stages, or more or less, and the diethylsulphate be also introduced in similar stages or continuously, preferably so arranging that an excess of alkali always exists, so as to prevent decomposition of the cellulose or cellulose conversion products during the reaction by possible development of local acidity which would form hydrocellulose and other depolymerization products.

For making highly ethylated cellulose it is only usually necessary to employ between about 8 and 20 molecules and preferably about 12 to 16 molecules of alkali and about 5 to 9, preferably about 6 to 7 molecules of diethyl sulphate to each molecular equivalent of cellulose taken as $C_6H_{10}O_5$, whilst observing the relation between the total alkali and the water as before mentioned. Much less than these quantities may however be used, especially when provision is made for very thorough, effective and homogeneous mixing or kneading or when it is desired to produce lower ethers of cellulose.

The cellulose or near conversion products used for the present invention are cellulose or cellulosic bodies which have not been rendered soluble in alkali.

The temperature employed for the ethylation may vary according to the particular ethylating agent employed and the duration of the reaction or other conditions. With diethyl sulphate the temperature for the ethylation may for example be between about 50°–55° C., and ordinary room temperature or lower, and cooling may be employed, especially for smoothing the reaction. Preferably a temperature not exceeding about 40° C., for example about ordinary room temperature or lower, is observed, especially in working with large quantities, as these lower temperatures are of assistance in obtaining cellulose ethers which give clear colorless solutions of the highest viscosity, and the quantity of alkali and diethyl sulphate can be reduced to the smallest amount. The temperature may however be higher than 50°–55°, for instance up to about 80° C. though this is usually less advantageous as the yields decrease and more alkyl sulphate is liable to be consumed by ordinary saponification without being operative in etherifying the cellulose body. Such high temperatures are especially disadvantageous when the reaction is prolonged, as they tend to make the ethylated product more and more brittle. Generally, therefore, the higher the temperature employed, the shorter should be the duration of the reaction.

Further it is of advantage to use liquid diluents such as benzol etc., which should be of such a nature that they are not liable themselves to undergo etherification, as would be the case for instance with alcohol. Such liquids facilitate the reaction so that this takes place more quickly and easily. With the use of benzol it appears as though the cellulose is etherified especially advantageously and homogeneously. The benzol or other liquid is preferably used in about the same quantity as the diethyl sulphate and for each addition of diethyl sulphate an equal weight of benzol is preferably taken, that is to say one preferably uses a solution of diethyl sulphate in about an equal quantity of benzol. The benzol or other liquids may however be used in larger or smaller quantities and may also be introduced all at once at the start or in any desired way during the reaction.

The use of the benzol or other liquids of the above stated nature have moreover the advantage of allowing the operation to be conducted much more easily from a mechanical point of view, inasmuch as in adopting the above stated proportions of material without benzol or equivalent liquids, the solution or mass is rather difficult to work, whereas by adding benzol or equivalent liquids it is possible to get a mass which can be worked with less friction on the mechanical parts and consequent liability to over-heating and irregular action in the mass. The liquid facilitates a homogeneous penetration by the diethyl sulphate and prevents the same from acting locally and irregularly on the alkali cellulose and tends to prevent local acidification taking place as the result of decomposition of the diethyl sulphate to ethyl sulphuric acid, the result of which might be that not sufficient alkali would be locally present to neutralize this acidity. Thus the benzol or like liquids promote uniform action on the cellulose. In other words from the point of view of temperature and homogeneity the etherification can be easily regulated, and from a mechanical point of view it is possible to conduct the reaction with the best of the quantities before indicated, whilst otherwise the operation would not be so easy to perform on a large scale.

The execution of the reaction for the production of the higher etherified product may occupy for example between about 6 and 24 hours or more or less. Especially for example it may take about 6 hours or less when the whole of the alkali is introduced at once and the whole of the diethyl sulphate, but this is much less advantageous when working at relatively high temperatures. But even when the reaction is conducted in stages (i. e. adding the diethyl sulphate or alkali and diethyl sulphate portionwise at intervals or progressively during the reaction) and when a relatively high temperature is used the reaction should preferably be performed in a relatively short time, say not more than about 8 to 12 hours, and preferably about 7 to 10 hours or less as otherwise the yields decrease more and more and the product gets more and more brittle. By way of example if the etherification is performed in a period of about 6 to 10 hours at a temperature of about 60° to 80° C., which however is not an ideal temperature and therefore also not a good execution of the process, the alakli and the diethyl sulphate may be put in preferably gradually and continuously, or they may be introduced by portions at intervals of about two hours for example, as for instance adding a portion of the alkali and a portion of diethyl sulphate, mixing for two hours, then adding further portions of alkali and diethyl sulphate and again mixing for two hours, and so on. If one prolonged these stages at high temperature such as 60° to 80° C., for example if each new addition of alkali and diethyl sulphate were only made at intervals of say 6 hours, so that the reaction occupied 24 hours altogether, then the resulting product is less valuable and the yields go down. As before mentioned it is preferable to conduct the reaction at lower temperatures such as hereinbefore indicated, as then the reaction can be more prolonged whilst obtaining highly etherified products giving clear colorless solutions of high viscosity, though too prolonged a reaction even in this case is not advisable.

*Example 1*

One molecular equivalent of cellulose ($C_6H_{10}O_5$) such as cotton or a near conversion product of cellulose, is treated with a 50% solution of 4 molecular equivalents of caustic soda, representing 100 per cent. of water relatively to the weight of cellulose employed. The whole is thoroughly kneaded together in a kneading machine. Then 1 to 2 molecular equivalents of diethylsulphate are introduced and well kneaded in, the temperature being kept between about 30° to about 40° to 55° C. After 1 to 2 hours another 4 to 6 molecules of caustic soda in the form of powder are kneaded into the reaction mass and afterwards another quantity of 2 to 3 molecules of diethyl sulphate, and the reaction is allowed to go on for another 2 to 3 hours. Then again 4 to 6 molecules of powdered caustic soda are kneaded in and another 2 to 2½ molecules of diethyl sulphate on the same lines. At 40° to 55° C. the reaction is finished in about 6 to 8 hours. With a lower temperature it takes longer and with a higher temperature it takes a shorter time, though as before mentioned it is preferable not to use higher temperatures.

The ethylated cellulose product obtained is treated with water so as to wash out all the by-products and is for example completely soluble in alcohol and alcohol-benzol. It is insoluble in hot or cold water and cannot be precipitated from alcohol solution by alkali. Moreover at no intermediate stage of the ethylation is the product soluble either in hot or cold water or precipitated from alcoholic solution by alkali.

The yield obtained is practically theoretical so that the whole of the cellulose used is transformed into ether without loss of cellulose.

If the quantity of water were increased so that the alkali would be added in a solution of less than 50%, the yields of the finished product for the same quantity of raw material used would decrease accordingly and the process would become uneconomical. If on the other hand the temperature is maintained say above 75° to 80° C. whilst prolonging the reaction, the product becomes more or less brittle.

*Example 2*

The materials are taken in about the same proportions as for Example 1, working in substantially the same way, except that the temperature observed during the ethylation is between about 30° C. and ordinary temperature or lower, or even with strong cooling. The lower the temperature the longer the duration of the reaction. The product is similar to that obtained in Example 1, the yield being likewise practically theoretical.

*Example 3*

One molecular equivalent of cellulose ($C_6H_{10}O_5$) or a near conversion product of cellulose is impregnated with an equal weight of water, i. e. 100% relatively to the weight of the cellulose and then kneaded with 4 molecular equivalents of caustic soda in powdered form and then 1½ molecular equivalents of diethyl sulphate are kneaded in at about 40° C. After about 1 to 2 hours a further quantity of 4 to 6 molecules of caustic soda in powdered form and 2 to 3 molecules of diethyl sulphate are incorporated at about the same temperature, further additions of alkali and diethyl sulphate being similarly made at intervals of about 2 hours until in all, i. e. in the entire process, about 12 to 18 molecules of alkali and 6 to 8½ molecules of diethyl sulphate have been added and allowed to react. The product is washed with water. It is insoluble in water, either cold or hot, and is soluble for example in alcohol and in alcohol-benzene.

*Example 4*

One molecular equivalent of cellulose ($C_6H_{10}O_5$) or a near conversion product of cellulose is impregnated with a 20% solution of caustic soda during 5 hours, allowing to stand for about 5 hours, and then squeezed out or centrifuged so as to contain about 100% of water, relatively to the weight of cellulose taken as 100%, i. e. an equal quantity of water. About 4¼ molecular equivalents of caustic soda in the form of powder are then kneaded with it and then 1 to 2 molecular equivalents of diethyl sulphate, the working conditions being otherwise similar to that in Example 1 or 2, further additions of alkali and diethyl sulphate being made at intervals so as to make up about the same total quantities of alkali and diethyl sulphate as specified in said examples and the product being washed with water. A similar product is obtained.

Instead of caustic soda other alkalies may be employed for the process of the present invention, such for example as caustic potash.

Instead of using diethyl sulphate for the alkylation other alkylating agents may be used, such as higher homologues thereof, or lower homologues such as dimethyl sulphate. In this latter case, as the reaction velocity of the dimethyl sulphate is much more intense than that of diethyl sulphate it is desirable to work at low temperatures, preferably with strong cooling to 0° C. or lower so as to prevent or reduce the partial consumption of the dimethyl sulphate by ordinary saponification without etherification.

For such other alkylating agents the same conditions apply as regards restricting the quantity of water within the limits before indicated, that is to say, to an amount not greater than about 400 per cent. relatively to the weight of the cellulose and preferably from about the natural humidity content of the cellulose body up to about 50 to 150 or 200 per cent., and the relationship of the quantity of alkali employed and the water or humidity (disregarding water formed in the reaction) being such as would correspond in the sense as aforesaid to a solution of about 75% to 95% or more of the alkali in the water, and in any case to a solution of not less than about 50%.

The alkali for the etherification preferably in a powdered form may be added all at once or in stages or continuously during the reaction and the same remark applies to the etherifying agent.

*Example 5*

One molecular equivalent of cellulose ($C_6H_{10}O_5$) such as cotton or a near conversion product of cellulose is treated with a 50% solution of 4 molecular equivalents of caustic soda representing 100% of water relatively to the weight of cellulose and the whole is thoroughly kneaded. Then 1 to 2 molecules of dimethyl sulphate are introduced and well kneaded in, the temperature being kept down at about 0° or lower. After about 1 to 3 hours another 4 to 6 molecules of caustic soda in the form of powder are kneaded in and then another 2 to 3 molecules of dimethyl sulphate and the reaction is allowed to proceed for another 1 to 3 hours. Then a further 4 to 8 molecules of powdered caustic soda are incorporated and another 2 to 3½ molecules of dimethyl sulphate are added on the same lines the temperature being kept down by cooling continued during the methylating operation. The reaction is finished in about 6 to 8 hours. The product of this example is soluble for example in alcohol-benzol but not in alcohol nor in hot or cold water.

As before mentioned it is of advantage to employ in the etherification process liquids, such as benzol, which are not themselves liable to be etherified, and this course may advantageously be adopted in the foregoing examples. For instance, the diethyl or dimethyl sulphate employed in these examples may be added in solution in about an equal quantity of benzol, or the benzol may all be added before the etherification or in portions during the etherification, the procedure being otherwise as described in the examples.

It is of course to be understood that the examples are only given by way of illustration and that the same can be varied considerably without departing from the spirit of the invention.

By varying the conditions for the manufacture of methyl cellulose other solubilities relatively to organic solvents are obtained but in observing the fundamental conditions as to restricted quantities of water and application of concentrated alkali before indicated, the methyl cellulose products obtained or passed through are never soluble in hot or cold water, unlike the methyl cellulose products previously known or described.

Instead of methyl or ethyl sulphate also homologues of them may be used.

Contact substances or catalysts such for example as copper powder, copper salts, or hydroxides, may be employed in the etherification to assist the reaction.

Instead of alkyl sulphates other suitable alkylating agents may be used for the process of the invention, whilst observing the indicated conditions as to restricted water quantity and concentrated application of alkali, for example halogen alkyls such as ethyl or methyl chloride. In the case of halogen alkyls however, especially ethyl or methyl chloride, or higher homologues of them, the temperature of reaction is preferably raised in order to get quicker reaction, and the reaction is preferably performed in the presence of copper powder, copper salts or hydroxides, or other suitable metals, hydroxides, salts or contact substances. By raising the temperature, however, the cellulose is exposed to risk of being partly destroyed or depolymerized, especially as pressure apparatus have to be used for the alkylation, so that this is not advantageous.

By using smaller quantities of the diethyl or dimethyl sulphate or other alkylated agents, lower ethylated, methylated or alkylated cellulose derivatives can be obtained and are included in the present invention. As before mentioned, the solubility of the products in organic solvents is less in proportion as the degree of alkylation is lower, but such products are still insoluble in any stage in hot or cold water.

Further, while observing the fundamental conditions laid down as to restricting the quantity of water and concentrated application of alkali as before mentioned, I may employ mixtures of different alkylating agents, for instance mixtures of diethyl and dimethyl sulphate in order to obtain "mixed" cellulose ethers. Or with the like object the cellulose or cellulose conversion products may be partly etherified with one or more alkylating agents and further etherified with another or others. Such mixed conversion products are likewise included in the present invention.

The new products, and especially the higher alkylated products, may be applied or employed for the manufacture of cinematographic, photographic or other films, artificial filaments, celluloid-like masses, electric insulating materials, varnishes, coating materials, or any other purposes for which cellulose esters or ethers have been proposed or used, in combination or not with any known or suitable solvents, plastifying agents or other substances. Any known or suitable methods may be applied, as for example mixing the new etherified products with solvents or plastifying bodies of high boiling points and solvents of low boiling point for making films or celluloid or with solvents of either or both classes for making solutions, dope, varnishes and so on. Any suitable or usual machines or apparatus may be employed, for example such as usual for making nitrocellulose or acetyl cellulose films and celluloid, or any other industrial applications.

What I claim and desire to secure by Letters Patent is:—

1. As new products lower, i. e. partially etherified aliphatic ethers of cellulose, insoluble in hot or cold water and which have not the property of being precipitated from alcoholic solution by alcoholic solutions of alkali.

2. As a new product of lower, i. e. partially ethylated cellulose insoluble in hot or cold water and not having the property of being precipitated from alcoholic solution by alcoholic solutions of alkali.

HENRY DREYFUS.